United States Patent
Takeda et al.

(10) Patent No.: US 12,150,140 B2
(45) Date of Patent: Nov. 19, 2024

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 566 days.

(21) Appl. No.: 17/439,266

(22) PCT Filed: Mar. 15, 2019

(86) PCT No.: PCT/JP2019/010912
§ 371 (c)(1),
(2) Date: Sep. 14, 2021

(87) PCT Pub. No.: WO2020/188644
PCT Pub. Date: Sep. 24, 2020

(65) Prior Publication Data
US 2022/0201732 A1 Jun. 23, 2022

(51) Int. Cl.
*H04W 4/00* (2018.01)
*H04L 1/1812* (2023.01)
*H04W 72/23* (2023.01)

(52) U.S. Cl.
CPC ........... *H04W 72/23* (2023.01); *H04L 1/1812* (2013.01)

(58) Field of Classification Search
None
See application file for complete search history.

(56) References Cited

U.S. PATENT DOCUMENTS

| 2016/0157213 A1 | 6/2016 | Takeda et al. |
| 2017/0273056 A1 | 9/2017 | Papasakellariou |
| 2018/0049229 A1* | 2/2018 | Dinan ................... H04W 72/21 |
| 2019/0116005 A1 | 4/2019 | Harada et al. |

(Continued)

FOREIGN PATENT DOCUMENTS

| CN | 105284151 A | 1/2016 |
| CN | 109075915 A | 12/2018 |

(Continued)

OTHER PUBLICATIONS

Office Action in counterpart Chinese Patent Application No. 201980096418.8 issued on Jun. 1, 2023 (19 pages).

(Continued)

*Primary Examiner* — Zewdu A Beyen
(74) *Attorney, Agent, or Firm* — Osha Bergman Watanabe & Burton LLP

(57) ABSTRACT

A user terminal according to an aspect of the present disclosure comprises: a reception unit which receives downlink control information including a field for each transport block (TB) or a field for a specific transport block (TB); and a control unit which controls the transmission or reception of a plurality of different transport blocks (TB) using a plurality of shared channels that are scheduled according to the downlink control information over a plurality of time units. Accordingly, it is possible to appropriately control the transmission or reception of a plurality of pieces of data that are multi-data scheduled.

10 Claims, 8 Drawing Sheets

(56) References Cited

U.S. PATENT DOCUMENTS

2020/0146034 A1* 5/2020 Bagheri ............ H04W 72/1268
2022/0303067 A1 9/2022 Dinan et al.

FOREIGN PATENT DOCUMENTS

CN 109076387 A 12/2018
JP 2018-137792 A 8/2018

OTHER PUBLICATIONS

1 Office Action in counterpart Japanese Patent Application No. 2021-506808 issued on Aug. 16, 2022 (6 pages).
International Search Report issued in PCT/JP2019/010912, mailed on May 28, 2019 (5 pages).
Written Opinion of the International Searching Authority issued in PCT/JP2019/010912, mailed on May 28, 2019 (5 pages).
Nokia, Nokia Shanghai Bell; "Scheduling of multiple DL/UL transport blocks"; 3GPP TSG RAN WG1 Meeting #96, R1-1901965; Athens, Greece, Feb. 25-Mar. 1, 2019 (5 pages).
MediaTek Inc .; "Discussion on new DCI format for URLLC"; 3GPP TSG RAN WG1 Meeting #93, R1-1806809; Busan, Korea, May 21-25, 2018 (8 pages).
Huawei, HiSilicon; "Scheduling multiple DL/UL transport blocks for SC-PTM and unicast"; 3GPP TSG RAN WG1 Meeting #96, R1-1901504; Athens, Greece, Feb. 25-Mar. 1, 2019 (12 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

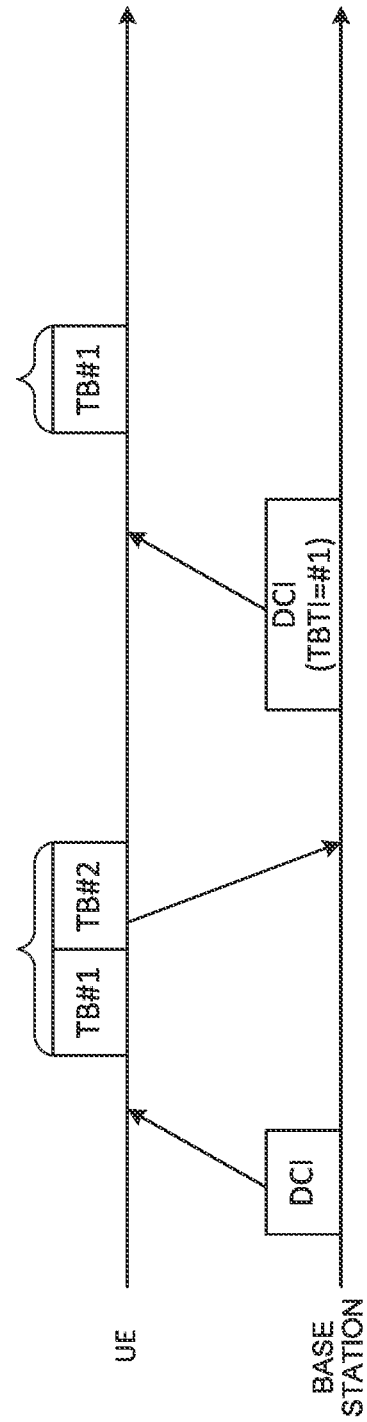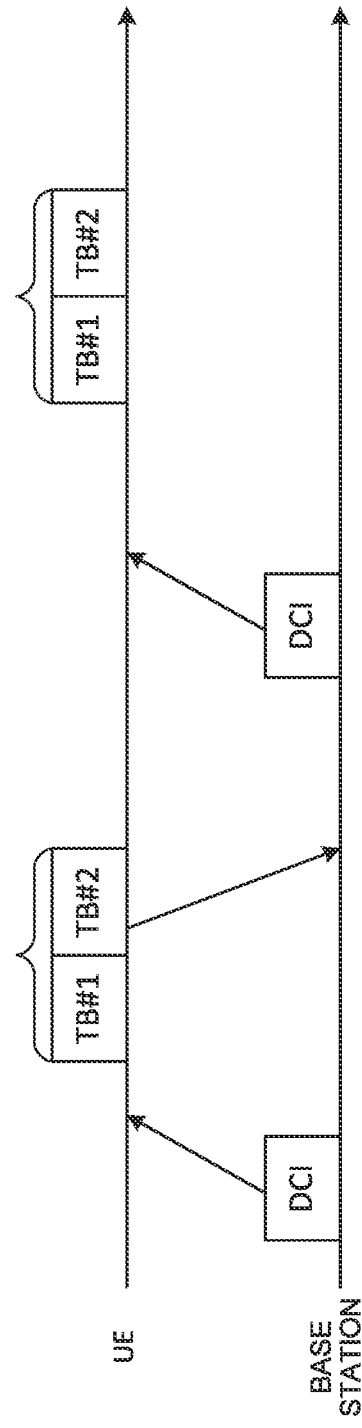

USER TERMINAL AND RADIO COMMUNICATION METHOD

TECHNICAL FIELD

The present disclosure relates to a user terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

In existing LTE systems (for example, 3GPP Rel. 8 to Rel. 14), a user terminal (User Equipment (UE)) controls transmission of an uplink shared channel (for example, Physical Uplink Shared Channel (PUSCH)) and reception of a downlink shared channel (Physical Downlink Control Channel (PDSCH)), based on downlink control information (DCI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), it is under study that a plurality of PUSCHs corresponding to a plurality of pieces of data (also referred to as a "transport block," a "codeword," or the like) are scheduled to different time units (or different time domain resources) by a single piece of DCI (also referred to as multi-data scheduling, or the like).

In up to NR Rel. 15, however, it is assumed that the same data is scheduled over different time units (repeated transmission) by a single piece of DCI, but it is not assumed that different pieces of data are scheduled over different time units. Therefore, transmission or reception of a plurality of pieces of data may not be appropriately controlled which are scheduled over different time units (or different time domain resources) by a single piece of DCI.

In view of this, it is an object of the present disclosure to provide a user terminal and a radio communication method that can appropriately control transmission or reception of a plurality of pieces of data that are multi-data scheduled.

Solution to Problem

A user terminal according to an aspect of the present disclosure includes a receiving section that receives downlink control information including a field for each transport block (TB) or a field for a specific transport block (TB), and a control section that controls transmission or reception of a plurality of different transport blocks (TBs) using a plurality of shared channels that are scheduled over a plurality of time units by the downlink control information.

Advantageous Effects of Invention

According to an aspect of the present disclosure, it is possible to appropriately control transmission or reception of a plurality of pieces of data that are multi-data scheduled.

BRIEF DESCRIPTION OF DRAWINGS

FIGS. 4A and 4B are diagrams to show examples of retransmission control according to a second aspect;

DESCRIPTION OF EMBODIMENTS (NR-U)

Figure 1:
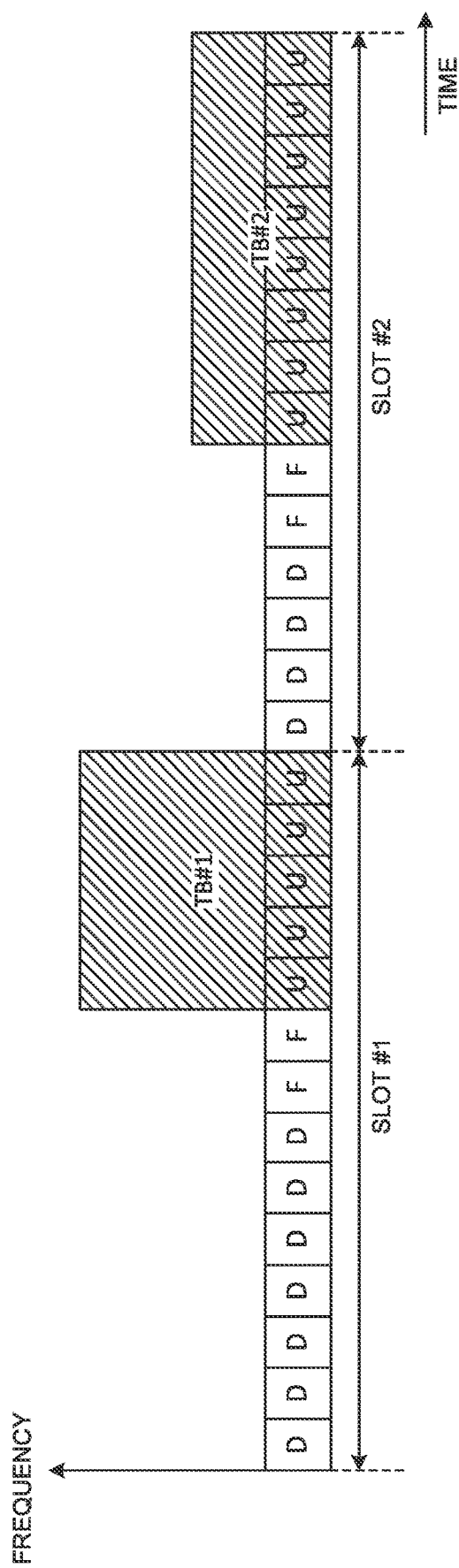
FIG. 1 is a diagram to show an example of multi-data scheduling.

For NR, it is studied to use an unlicensed carrier (carrier within an unlicensed band) as well as a licensed carrier (carrier within a licensed band) for communication. A licensed carrier is a frequency carrier that is exclusively assigned to one operator. An unlicensed carrier is a frequency carrier that is shared by a plurality of operators, RATs, and the like.

The licensed carrier is also referred to as a component carrier (CC), a cell, a primary cell (PCell), a secondary cell (SCell), a primary secondary cell (PSCell), and so on. The unlicensed carrier is also referred to as an NR-U (NR-Unlicensed), a CC, an unlicensed CC, a cell, an LAA SCell (License-Assisted Access SCell), and so on.

In systems in which NR is operated on unlicensed carriers (for example, LAA (Licensed Assisted Access) system), it is conceivable that interference control functionality is required in order to allow coexistence with other operators' NR or LTE, or wireless LAN (Local Area Network) or other systems. Note that an operation mode of LAA systems may be based on any of dual connectivity (DC) with a licensed carrier, carrier aggregation (CA) or standalone (SA), and may be referred to as "LAA", "NR-U" and so on.

Generally, a transmission point (for example, base station (gNode B (gNB), eNodeB (eNB)), a user terminal (User Equipment (UE)) and so on) that perform communication by using an unlicensed carrier are prohibited from performing transmission on the unlicensed carrier when detecting other entities (for example, other UEs) which perform communication on the unlicensed carrier.

Therefore, the transmitting point performs listening (LBT) at timing a given period before transmission timing. Specifically, the transmission point that performs LBT searches for a target band (e.g., one component carrier (CC)) at timing a given period before transmission timing (e.g., the immediately preceding subframe), and check whether another apparatus (e.g., base station, UE, Wi-Fi (registered trademark) apparatus and so on) communicates on the band or not.

Note that, in the present specification, "listening" refers to the operation of, before a transmission point (for example, base station, user terminal, and so on) transmits a signal, detecting/measuring whether or not a signal exceeding a given level (for example, a given power) is being transmitted from another transmission point. The listening performed by the transmission point is also referred to as "LBT (Listen Before Talk)", "CCA (Clear Channel Assessment)", "carrier sense" or "channel access procedure (CCA)" and so on. In unlicensed carriers, an access method with collision control (also called "receiver assisted access", "receiver assisted LBT" and so on) may be applied.

When the transmission point can confirm that no other apparatuses are communicating, the transmission point performs transmission using the carrier. For example, when the received power measured by listening is equal to or less than a given threshold, the transmission point determines that a channel is in a free state and performs transmission. The wording "a channel is in a free state," can be expressed as, in other words, the channel is not occupied by a specific system, and it is also referred to as "a channel is idle", "a channel is clear", "a channel is free", "listening is successful" and so on.

On the other hand, when the transmission point detects that even a portion of a target carrier band is in use by another apparatus, the transmission point stops its transmission processing. For example, when the transmission point detects that the received power of a signal from such another apparatus in the band exceeds a given threshold, the transmission point determines that the channel is in a busy state, and makes no transmission. In a case of the busy state, listening is carried out again with respect to the channel, and the channel becomes available only after the free state is confirmed. Note that the method of judging whether a channel is in the free state/busy state based on LBT is not limited to this.

As described above, by introducing interference control that is based on an LBT mechanism and that is for use within the same frequency to transmission points in NR-U, it is possible to prevent interference between LAA and Wi-Fi (registered trademark), interference between LAA systems and so on. Even when transmission points are controlled independently per operator that runs an LAA system, LBT makes it possible to reduce interference without learning the details of each control.

(Multi-Data Scheduling)

For NR, it is under study that a plurality of PUSCHs corresponding to a plurality of pieces of data are scheduled over a plurality of time units (also called "multi-data scheduling" and so on) by a single piece of DCI.

Data to be multi-data scheduled may be referred to as a "transport block (TB)", a "codeword (Code word, CW)" and so on. A time unit may be, for example, a slot, a sub-slot, or the like. The sub-slot is a time unit shorter than a slot, or a time unit including fewer number of symbols (for example, two symbols, three or four symbols, seven symbols) than those of a slot. The sub-slot may be referred to as a "mini-slot", a "half slot" and so on.

Each TB may be mapped (allocated) to at most one slot or one sub-slot. A plurality of TBs scheduled by a single piece of DCI may be allocated to consecutive slots or sub-slots.

FIG. 1 is a diagram to show an example of multi-data scheduling. In FIG. 1, a time unit to be multi-data scheduled is assumed to be, for example, a slot, but it is not limited to this and may be a sub-slot and the like. Note that a PUSCH is shown as an example in FIG. 1, but the same applies to a PDSCH.

For example, in FIG. 1, PUSCHs for transmitting TB #1 and #2 are scheduled in consecutive slots #1 and #2, respectively, by a single piece of DCI.

As shown in FIG. 1, it is assumed that consecutive slots #1 and #2 to be multi-data scheduled have different slot configurations. For example, slot #1 in FIG. 1 includes seven downlink (DL) symbols, two flexible symbols, and five uplink (UL) symbols. On the other hand, slot #2 includes four DL symbols, two flexible symbols, and eight UL symbols.

Therefore, it is assumed that the maximum number of UL symbols that can be allocated to the PUSCH for TB #1 in slot #1 is different from the maximum number of UL symbols that can be allocated to the PUSCH for TB #2 in slot #2. For example, in FIG. 1, a maximum of five symbols can be allocated for TB #1 in slot #1, and a maximum of eight symbols can be allocated for TB #2 in slot #2.

In addition, NR can flexibly allocate time domain resources (e.g., a given number of symbols) within a slot to TBs. Thus, when each of different time domain resources in a plurality of slots are scheduled to a plurality of TBs by a single piece of DCI, multi-data scheduling may not be appropriately controlled.

Therefore, the inventors of the present invention studied a method for appropriately controlling transmission or reception of a plurality of TBs that are multi-data scheduled, and came up with the present invention (first aspect). The inventors of the present invention also studied a method for appropriately controlling retransmission of a plurality of TBs that are multi-data scheduled, and came up with the present invention (second aspect).

Embodiments according to the present invention will be described in detail with reference to the drawings as follows. Note that each of the following first and second aspects may be used alone, or at least two aspects may be used in combination.

Note that, in the following, a time unit to be multi-data scheduled is a slot, but as mentioned above, the time unit may be a sub-slot or the like.

Hereinafter, an example in which a plurality of TBs are each mapped to time domain resources in different slots is given, but the present invention is not limited to this. If the plurality of TBs are mapped to different time domain resources, each of the plurality of TBs may be mapped over a plurality of slots. At least one of transmission and reception (transmission/reception) of each TB using time domain resources (e.g., a given number of symbols) allocated across a slot boundary is also referred to as "multi-segment transmission/reception", "two-segment transmission/reception", "cross-slot boundary transmission/reception" and so on.

Multi-data scheduling may be applied in NR-U cells (cells where listening is performed before transmission), but the present invention is not limited to this. Multi-data scheduling may be applied in licensed band cells (cells where listening is not performed before transmission, serving cells).

(First Aspect)

In a first aspect, DCI for multi-data scheduling is described.

In the first aspect, a UE may receive DCI including a field for each TB (a first DCI example) or a DCI including a field for a specific TB (a second DCI example). The UE may control transmission of a plurality of different TBs using a plurality of PUSCHs that are scheduled over a plurality of slots by the DCI.

The DCI may be, for example, DCI format 0_0 or 0_1 used for scheduling a PUSCH, or may be a new DCI format.

<First DCI>

Figure 2:
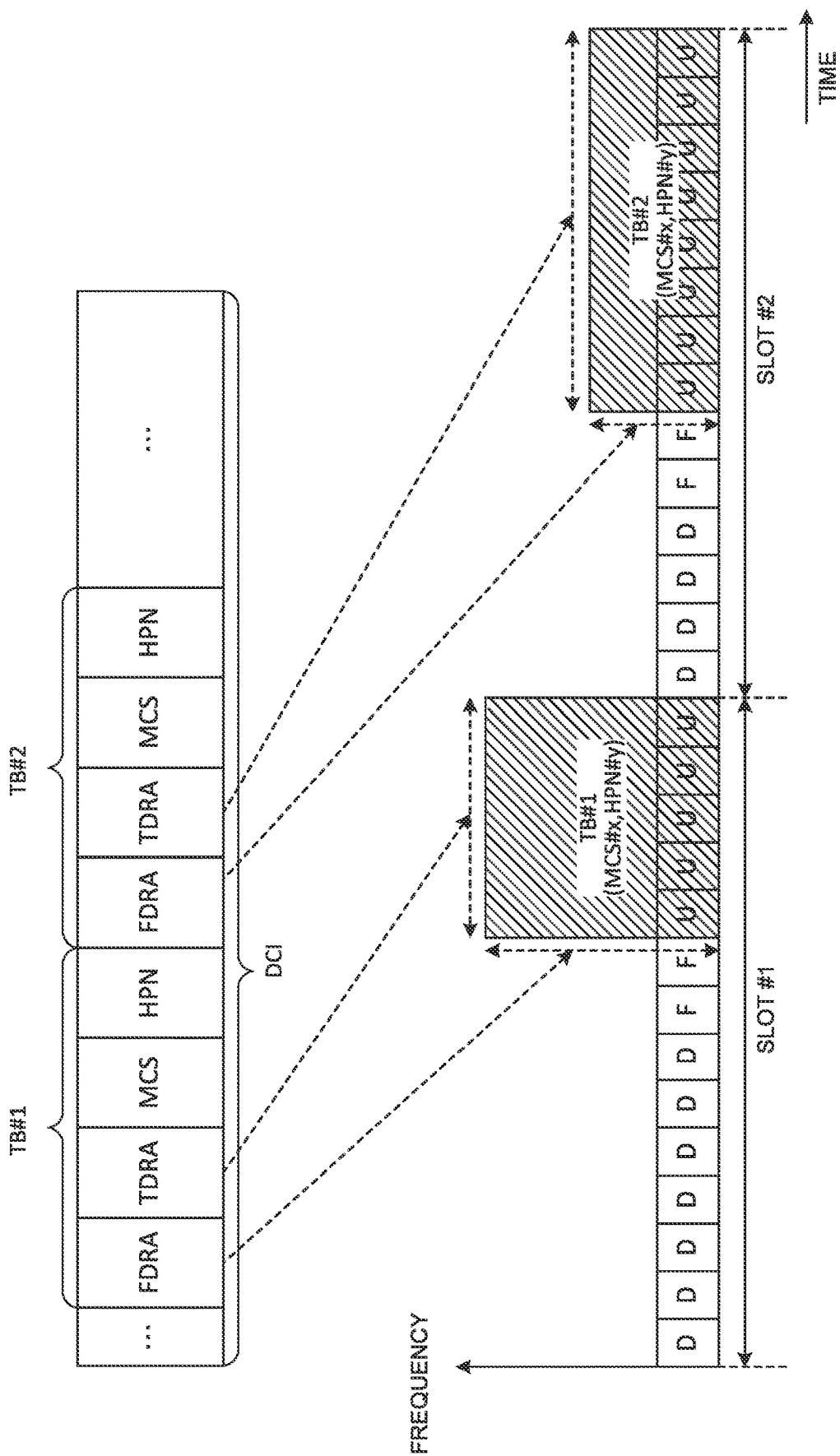
FIG. 2 is a diagram to show an example of multi-data scheduling based on a first DCI according to a first aspect.

FIG. 2 is a diagram to show an example of multi-data scheduling based on the first DCI according to the first aspect. Note that, in FIG. 2, the number n of a plurality of TBs scheduled by one piece of DCI is assumed to be 2, but it may be 2 or more.

The number n of the plurality of TBs may be configured by a higher layer parameter (for example, information element (IE) of RRC), specified by Medium Access Control (MAC) control element (MAC CE), or specified by a given field value in the DCI, or determined in a fixed manner according to the specification.

In FIG. 2, DCI including one or more fields for each TB is shown. The one or more fields for each TB may include at least one of a time domain resource allocation (TDRA) field, a frequency domain resource allocation (FDRA) field, an MCS field, and a hybrid automatic repeat request (HARQ) process number (HARQ Process Number (HPN)) field.

For example, in FIG. 2, the DCI includes a TDRA field, an FDRA field, an MCS field, and an HPN field for each of TBs #1 and #2.

As shown in FIG. 2, the UE may determine a time domain resource (for example, one or more symbols) allocated to each TB, based on the value of the TDRA field for each TB.

The UE may determine a frequency domain resource (for example, one or more physical resource blocks (PRBs) or one or more resource block groups (RBGs)) allocated to each TB, based on the value of the FDRA field for each TB.

The UE may determine at least one of a modulation order and a target coding rate to be allocated to each TB, based on the value of the MCS field (MCS index) for each TB. The UE may also determine a transport block size (TBS) of each TB, based on the determined modulation order and target coding rate.

The UE may determine an HPN (or HARQ process) allocated to each TB, based on the value of the HPN field for each TB.

In the first DCI example, at least one of the time domain resource, the frequency domain resource, the MCS and the HPN to be allocated to each of the plurality of TBs scheduled by a single piece of DCI is explicitly specified. Therefore, at least one of the size of the plurality of TBs (TBS), the time domain resource, the frequency domain resource, the modulation order and the target coding rate can be flexibly controlled.

<Second DCI>

Figure 3:
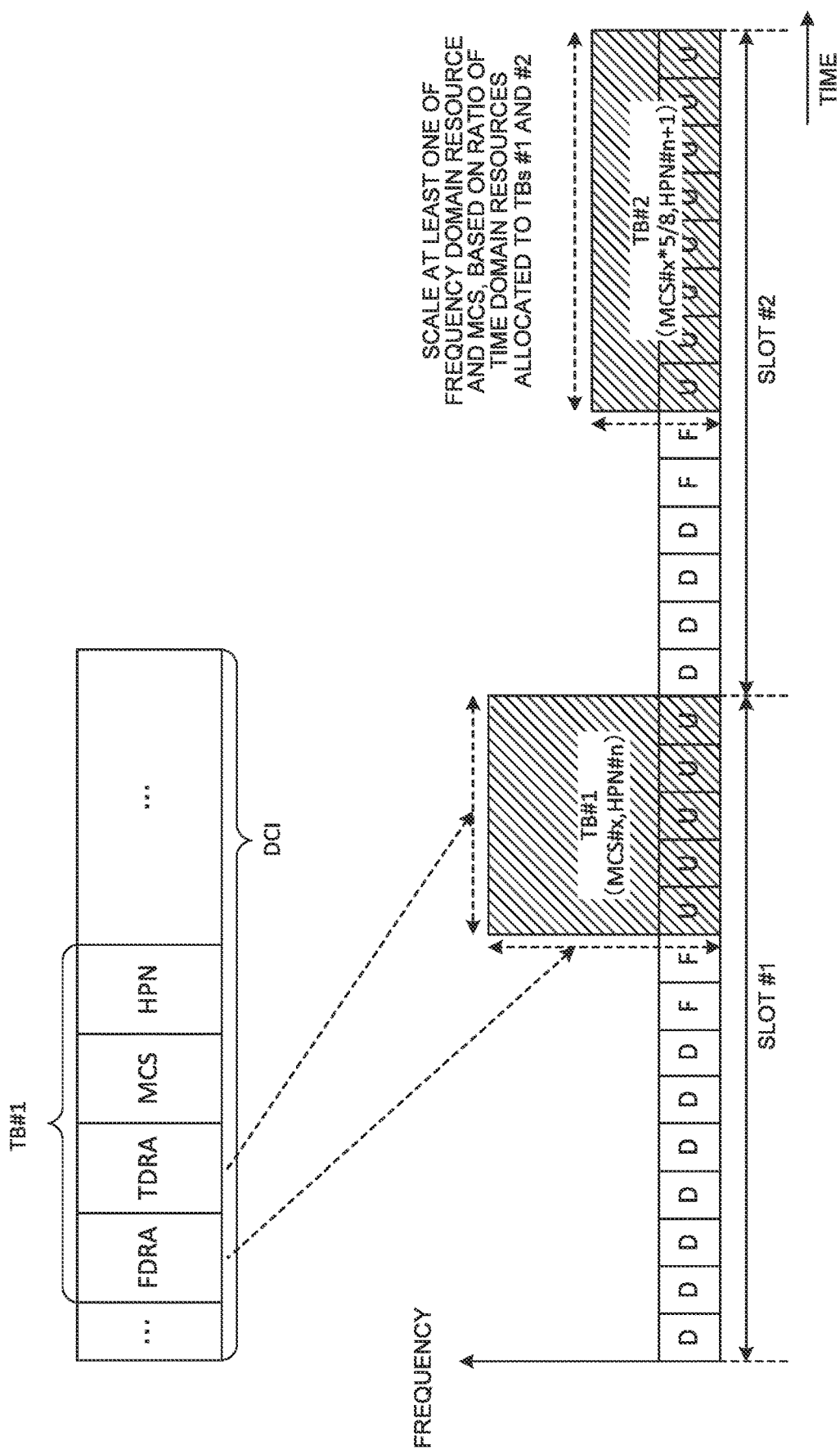
FIG. 3 is a diagram to show an example of multi-data scheduling based on a second DCI according to the first aspect.

FIG. 3 is a diagram to show an example of multi-data scheduling based on a second DCI according to the first aspect. Note that, in FIG. 3, the number n of a plurality of TBs scheduled by one piece of DCI is assumed to be 2, but it may be 2 or more. When scheduling 3 or more TBs, for each TB #i after TB #3, the following TB #2 may be interpreted as TB #i. In FIG. 3, the differences from FIG. 2 are mainly described.

In FIG. 3, DCI including one or more fields for a specific TB among n (n>1) TBs #1 to #n is shown. The one or more fields for the specific TB may include at least one of a time domain resource allocation (TDRA) field, a frequency domain resource allocation (FDRA) field, an MCS field, and a HARQ process number (HPN) field.

The specific TB is, for example, but not limited to, the first TB of the n TBs #1 to #n scheduled by a single piece of DCI, the TB with the smallest index, or the like.

For example, in FIG. 3, TB #1, which is the first one of TBs #1 and #2 scheduled by the single piece of DCI, includes a TDRA field, an FDRA field, an MCS field and an HPN field. On the other hand, the DCI does not include at least one of a TDRA field, an FDRA field, an MCS field and an HPN field for TB #2.

For example, a case is assumed in which, for TB #1 which is the first one of TBs #1 and #2 scheduled by the single piece of DCI, the DCI includes a TDRA field, an FDRA field, an MCS field and an HPN field, and for TB #2, the DCI includes none of a TDRA field, an FDRA field, an MCS field and a HPN field. In this case, in FIG. 3, the UE may determine a time domain resource (for example, one or more symbols) allocated to TB #2, based on the value of the TDRA field for TB #1. For example, the UE may assume that the time domain resource allocated to TB #2 is the same as the time domain resource allocated to TB #1. Alternatively, the UE may determine the time domain resource allocated to TB #2, based on the configuration of the slot in which TB #2 is transmitted. For example, the UE may assume that all UL symbols in the slot are time domain resources allocated to TB #2.

The UE may determine a frequency domain resource (for example, one or more PRBs or one or more RBGs) allocated to TB #2, based on the value of the FDRA field for TB #1. Specifically, the UE may determine the frequency domain resource allocated to TB #2, based on the ratio of the time domain resource allocated to TB #1 to the time domain resource allocated to TB #2, and the value of the FDRA field for the TB #1.

For example, in FIG. 3, five symbols are allocated to TB #1 and eight symbols are allocated to TB #2. In this case, the frequency domain resource allocated to TB #2 may be approximately five-eighths as much as the frequency domain resource allocated to TB #1 (for example, a given number of RBs that is greater than the number of RBs allocated to TB #1 multiplied by five-eighths).

Thus, based on the ratio of the time domain resources allocated to TBs #1 and #2, the UE may determine the frequency domain resource allocated to TB #2 by scaling the frequency domain resource determined based on the FDRA field of TB #1, based on the ratio. In this case, the number of resource elements (REs) allocated to TBs #1 and #2 may be the same.

Note that the UE may assume that the starting position, center position (Center RB), or ending position of the frequency domain resource allocated to TB #2 is the same as the starting position, center position, or ending position of the frequency domain resource allocated to TB #1. Alternatively, the UE may derive the starting position of the frequency domain resource to be allocated to TB #2, based on a higher layer parameter and a given field in the DCI.

The UE may determine an MCS index allocated to the TB #2, based on the value of an MCS field for TB #1. Specifically, the UE may determine the frequency domain resource allocated to TB #2, based on the ratio of the time domain resource allocated to TB #1 to the time domain resource allocated to TB #2, and the value of the FDRA field for the TB #1.

For example, in FIG. 3, five symbols are allocated to TB #1 and eight symbols are allocated to TB #2. In this case, the MCS index (value) of TB #2 may be five-eighths as much as the MCS index (value) of TB #1. The UE may determine at least one of the modulation order and target coding rate for TB #2, based on the determined MCS index of TB #2. The UE may determine a TBS for TB #2, based on the determined modulation order and target coding rate.

The UE may determine the HPN (or HARQ process) allocated to TB #2, based on the value of the HPN field for TB #1. For example, when the value of the HPN field for TB #1 indicates HPN #n (n=0 to 8), the HPN for the subsequent TB #2 may be HPN #n+1. Note that, when n is the maximum value of the HPN (for example, eight), n+1 may be cycled to the minimum value (for example, 0).

In the second DCI example, at least one of the time-domain resource, frequency-domain resource, MCS, and HPN is explicitly specified for a particular TB among a plurality of TBs scheduled by a single piece of DCI, and at least one of the time-domain resource, frequency-domain resource, MCS, and HPN for other TBs are derived by the UE itself. Therefore, the overhead by multi-data scheduling can be reduced compared to the first DCI.

Note that the first DCI and the second DCI described above may be combined. For example, some of the FDRA, TDRA, MCS, and HPN fields in FIG. 2 (for example, the FDRA, TDRA, and MCS fields) may be provided for each TB, and another field (the HPN field) may be provided only for a specific TB (the first TB). In this case, an HPN for the subsequent TB may be derived based on the HPN for the first TB.

According to the first aspect, scheduling of a plurality of TBs can be appropriately controlled by a single piece of DCI.

(Second Aspect)

In a second aspect, retransmission control for multi-data scheduling is described.

In the second aspect, regarding a plurality of TBs that are transmitted for the first time based on a single piece of DCI, retransmission may be controlled for each TB or may be controlled for a plurality of TBs as a whole.

FIGS. 4A and 4B are diagrams to show examples of retransmission control according to the second aspect. Note that in FIGS. 4A and 4B, the number n of a plurality of TBs transmitted for the first time by a single piece of DCI is assumed to be two, but it may be two or more.

As shown in FIG. 4A, when the UE transmits a plurality of TBs scheduled by a single piece of DCI, a base station may schedule retransmission for each TB, based on the decoding result of each of the plurality of TBs.

For example, in FIG. 4A, the base station fails to decode TB #1 and succeeds in decoding TB #2. Thus, the base station may transmit DCI including a given field (for example, TB transmission information (TBTI) field). The TBTI field may be a bitmap equal to the number n of a plurality of TBs transmitted for the first time (here, n=2).

The DCI including the TBTI field may include a given field for a new data indicator (NDI) for each TB. The DCI may include a given field for a redundancy version (RV) for each TB or for a plurality of TBs in common.

The UE may control the retransmission of TB #1, based on at least one of the TBTI field, NDI field, and RV field in the DCI.

As shown in FIG. 4A, when retransmission is controlled for each TB, only TBs which fail to be decoded are retransmitted, reducing the overhead by the retransmission of a plurality of TBs that are multi-data scheduled.

As shown in FIG. 4B, when the UE transmits a plurality of TBs scheduled by a single piece of DCI, the base station may schedule retransmission of all of the plurality of TBs when the decoding of at least one of the plurality of TBs fails.

For example, in FIG. 4B, the base station fails to decode at least one of the TBs #1 and #2, so a DCI requesting retransmission of TBs #1 and #2 is transmitted. The DCI is as described in the first aspect.

The DCI may also include a given field for a new data indicator (NDI) common to the plurality of TBs. The DCI may include a given field for a redundancy version (RV) for each TB or for a plurality of TBs in common.

As shown in FIG. 4B, when the entire plurality of TBs that are multi-data scheduled are retransmitted, the control of the retransmission can be facilitated and the overhead of the DCI can be reduced.

As described above, according to the second aspect, retransmission control of at least one of the plurality of TBs that are multi-data scheduled can be appropriately performed.

(Other Aspects)

In the first and second aspects, multi-data scheduling of a plurality of TBs transmitted in a PUSCH has been described, but this embodiment can also be applied to multi-data scheduling of a plurality of TBs transmitted in a PDSCH as appropriate.

When applied to a PDSCH, DCI format 0_0 or 0_1 in the following may be interpreted as DCI format 1_0 or 1_1. The above PUSCH may be interpreted as a PDSCH. The TB transmission may be interpreted as the TB reception.

When a plurality of TBs transmitted on a PUSCH are multi-data scheduled, the transmission confirmation information (HARQ-ACK) for the plurality of TBs may be fed back from the UE to the base station for each TB. In this case, only the TBs that failed to be decoded can be retransmitted, thus reducing the retransmission overhead.

When a plurality of TBs transmitted on a PUSCH are multi-data scheduled, the transmission confirmation information (HARQ-ACK) for the plurality of TBs may be fed back from the UE to the base station for the entire plurality of TBs. In this case, a NACK may be fed back when at least one of the plurality of TBs fails to be decoded, and an ACK may be fed back when all of the plurality of TBs are successfully decoded. In this case, the overhead by the HARQ-ACK feedback can be reduced.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 5:
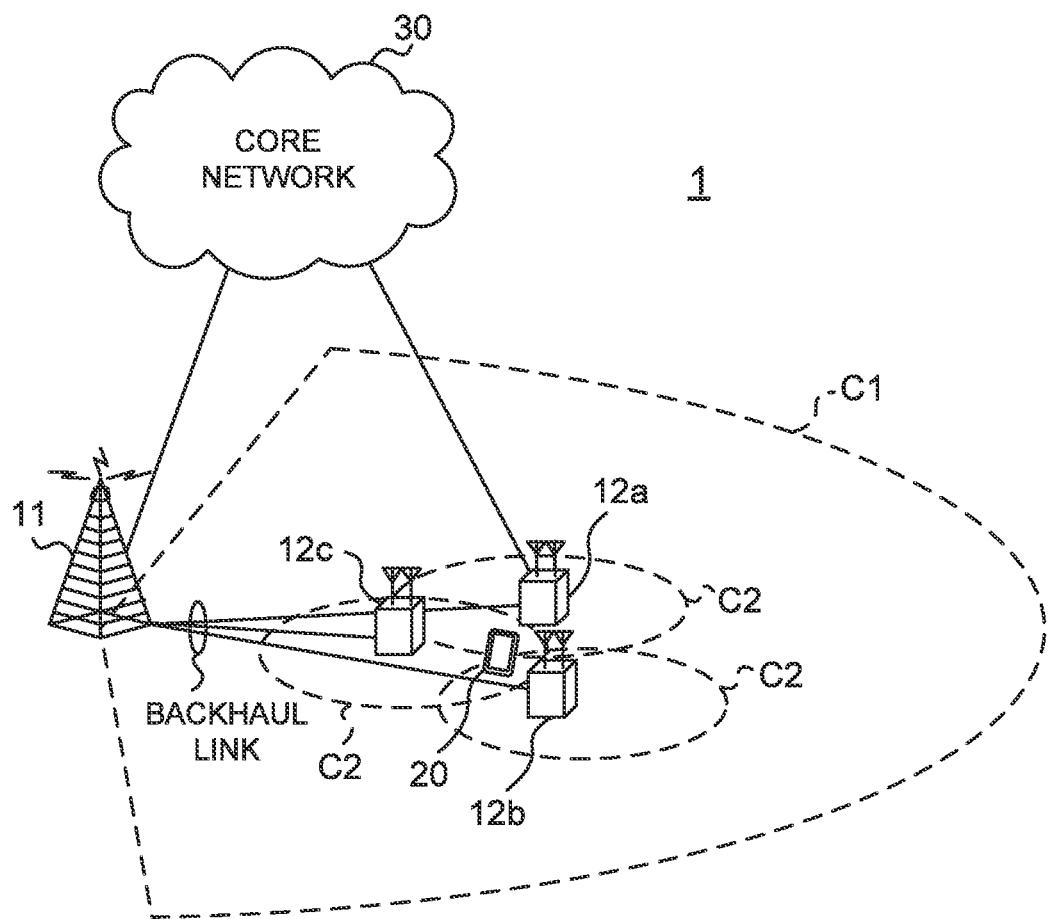
FIG. 5 is a diagram to show an example of a schematic structure of a radio communication system according to one embodiment.

FIG. 5 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC))

between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 6:
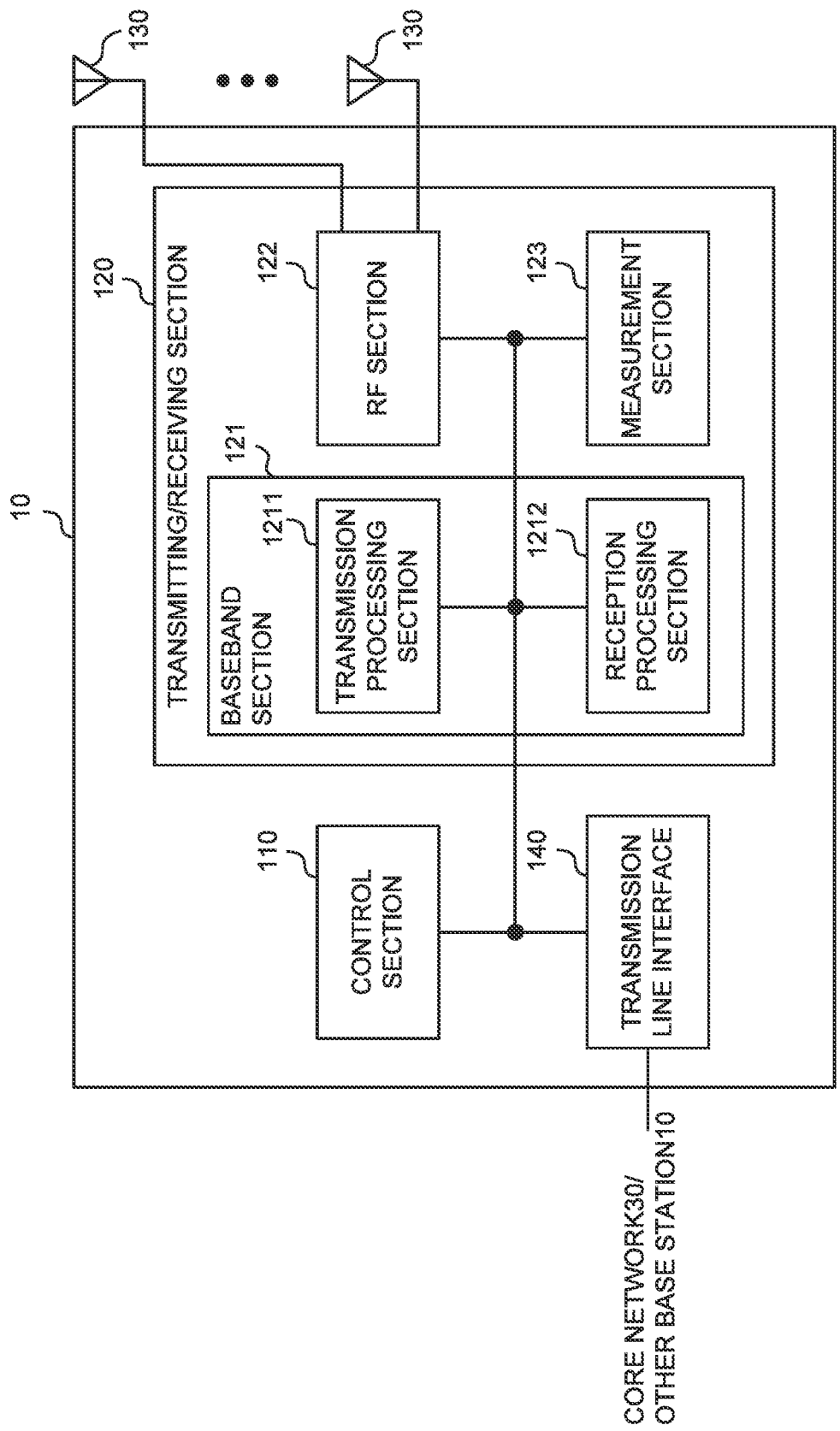
FIG. 6 is a diagram to show an example of a structure of a base station according to one embodiment.

FIG. 6 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, preceding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

The transmitting/receiving section 120 transmits downlink control information including fields for each transport block (TB) or fields for a specific transport block (TB).

The control section 110 may control transmission or reception of a plurality of different transport blocks (TBs) (for example, transmission of a plurality of TBs using a plurality of PDSCHs or reception of a plurality of TBs using a plurality of PUSCHs) by using a plurality of shared channels that are scheduled over a plurality of time units by the downlink control information.

The control section 110 may control transmission or reception of each of the plurality of TBs based on the value of the field for each TB.

The control section 110 may control transmission or reception of TBs other than the specific TB among the plurality of TBs, based on the value of the field for the specific TB.

The field for each TB or the field for the specific TB may include at least one of a time domain resource allocation field, a frequency domain resource field, a modulation coding scheme (MCS) field, a hybrid automatic repeat request (HARQ) process number field.

The control section 110 may control retransmission of each TB or retransmission of the entire plurality of TBs.

(User Terminal)

Figure 7:
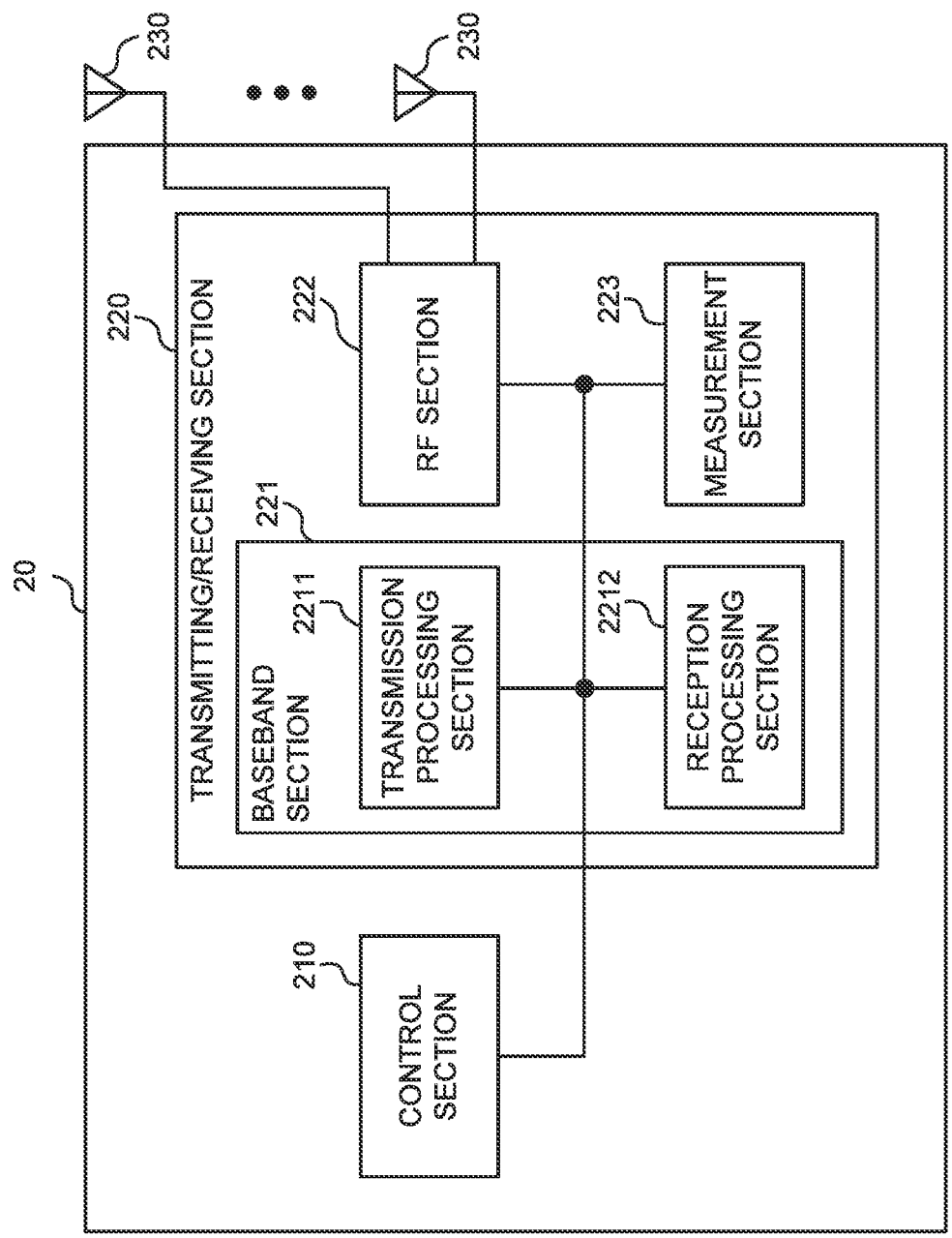
FIG. 7 is a diagram to show an example of a structure of a user terminal according to one embodiment.

FIG. 7 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

Note that the transmitting/receiving section 220 receives downlink control information including a field for each transport block (TB) or a field for a specific transport block (TB). Specifically, the transmitting/receiving section 220 may monitor a given search space set to detect the downlink control information.

The control section 210 may control transmission or reception of a plurality of different transport blocks (TBs) (for example, transmission of a plurality of TBs using a plurality of PUSCHs, or reception of a plurality of TBs using a plurality of PUSCHs), by using a plurality of shared channels that are scheduled over a plurality of time units by the downlink control information.

The control section 210 may control transmission or reception of each of the plurality of TBs based on the value of the field for each TB.

The control section 210 may control transmission or reception of TBs other than the specific TB among the plurality of TBs, based on the value of the field for the specific TB.

The field for each TB or the field for the specific TB may include at least one of a time domain resource allocation field, a frequency domain resource field, a modulation coding scheme (MCS) field, a hybrid automatic repeat request (HARQ) process number field.

The control section 210 may control retransmission of each TB or retransmission of the entire plurality of TBs.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 8:
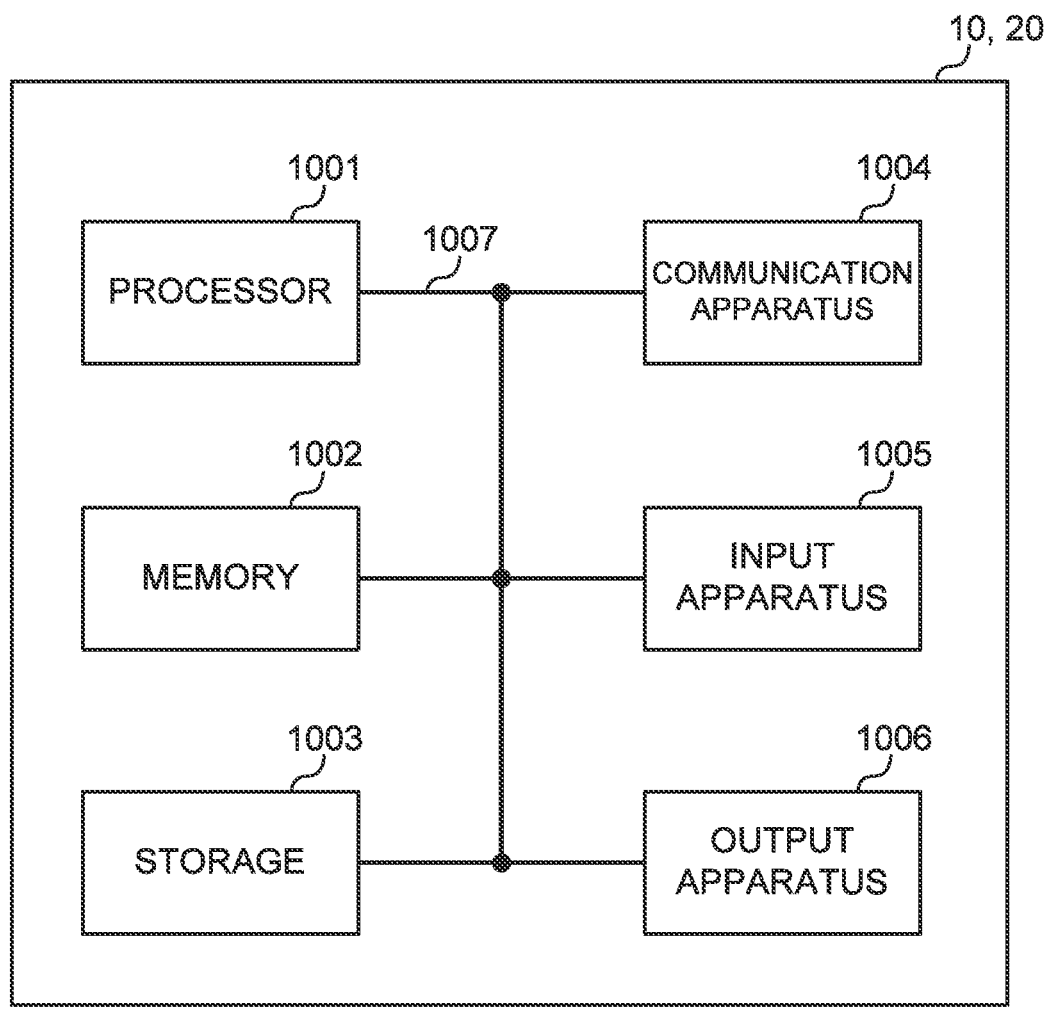
FIG. 8 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 8 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EE- PROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG),"a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiver that receives downlink control information to schedule transmission of a plurality of transport blocks (TBs) each using a plurality of uplink shared channels; and
   a processor that applies a value of a hybrid automatic repeat request (HARQ) process number field in the downlink control information to a HARQ process number for a first TB among the plurality of TBs, and determines, based on the HARQ process number for the first TB, a HARQ process number for a second TB among the plurality of TBs,
   wherein the processor determines, based on a value of a Time Domain Resource Allocation (TDRA) field for the first TB in the downlink control information, a time domain resource allocated to the second TB.

2. The terminal according to claim 1, wherein the downlink control information includes at least one of a new data indicator (NDI) field and a redundancy version (RV) field for each of the plurality of TBs.

3. The terminal according to claim 1, wherein the downlink control information includes a new data indicator (NDI) field and a redundancy version (RV) field for each of the plurality of TBs.

4. The terminal according to claim 1, wherein a number of the plurality of TBs is indicated by a value of a field included in the downlink control information.

5. The terminal according to claim 1, wherein the processor determines a HARQ process number for a 1+nth TB among the plurality of TBs by adding 1 to a HARQ process number for an nth TB among the plurality of TBs, and the processor, when the HARQ process number for the nth TB among the plurality of TBs is a maximum value of the HARQ process number field, determines that the HARQ process number for the 1+nth TB among the plurality of TBs is a minimum value of the HARQ process number field.

6. A radio communication method for a terminal, comprising:
   receiving downlink control information to schedule transmission of a plurality of transport blocks (TBs) each using a plurality of uplink shared channels;
   applying a value of a hybrid automatic repeat request (HARQ) process number field in the downlink control information to a HARQ process number for a first TB among the plurality of TBs;
   determining a HARQ process number for a second TB among the plurality of TBs based on the HARQ process number for the first TB; and
   determining, based on a value of a Time Domain Resource Allocation (TDRA) field for the first TB in the downlink control information, a time domain resource allocated to the second TB.

7. A base station comprising:
a transmitter that transmits downlink control information to schedule transmission of a plurality of transport blocks (TBs) each using a plurality of uplink shared channels; and
a processor that applies a value of a hybrid automatic repeat request (HARQ) process number field in the downlink control information to a HARQ process number for a first TB among the plurality of TBs, and determines, based on the HARQ process number for the first TB, a HARQ process number for a second TB among the plurality of TBs,
wherein the processor determines, based on a value of a time domain resource allocation (TDRA) field for the first TB in the downlink control information, a time domain resource allocated to the second TB.

8. A system comprising a terminal and a base station, wherein
the terminal comprises:
a receiver that receives downlink control information to schedule transmission of a plurality of transport blocks (TBs) each using a plurality of uplink shared channels; and
a processor of the terminal that applies a value of a hybrid automatic repeat request (HARQ) process number field in the downlink control information to a HARQ process number for a first TB among the plurality of TBs, and determines, based on the HARQ process number for the first TB, a HARQ process number for a second TB among the plurality of TBs,
wherein the processor of the terminal determines, based on a value of a Time Domain Resource Allocation (TDRA) field for the first TB in the downlink control information, a time domain resource allocated to the second TB, and
the base station comprises:
a transmitter that transmits the downlink control information; and
a processor of the base station that applies the value of the HARQ process number field in the downlink control information to the HARQ process number for the first TB among the plurality of TBs, and determines, based on the HARQ process number for the first TB, the HARQ process number for the second TB among the plurality of TBs,
wherein the processor of the base station determines, based on the value of the TDRA field for the first TB in the downlink control information, the time domain resource allocated to the second TB.

9. The terminal according to claim 2, wherein a number of the plurality of TBs is indicated by a value of a field included in the downlink control information.

10. The terminal according to claim 3, wherein a number of the plurality of TBs is indicated by a value of a field included in the downlink control information.

* * * * *